United States Patent
Shimoda (10) Patent No.: US 7,623,759 B2
(45) Date of Patent: Nov. 24, 2009

(54) REPRODUCTION APPARATUS AND REPRODUCTION METHOD

(75) Inventor: Nozomu Shimoda, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 803 days.

(21) Appl. No.: 11/362,733

(22) Filed: Feb. 28, 2006

(65) Prior Publication Data

US 2007/0077040 A1    Apr. 5, 2007

(30) Foreign Application Priority Data

Sep. 9, 2005    (JP) ............................. 2005-261566

(51) Int. Cl.
*H04N 5/91* (2006.01)
*H04N 7/00* (2006.01)

(52) U.S. Cl. ................ 386/95; 386/92; 386/46

(58) Field of Classification Search .............. 386/46, 386/92, 95, 52, 55, 124, 125
See application file for complete search history.

(56) References Cited

U.S. PATENT DOCUMENTS 7,239,793 B2 *    7/2007    Sparks et al. .............. 386/46
2005/0286546 A1 *    12/2005    Bassoli et al. ............. 370/432

FOREIGN PATENT DOCUMENTS

JP    2001-188643    7/2001
JP    2002-125214    4/2002

* cited by examiner

*Primary Examiner*—Robert Chevalier
(74) *Attorney, Agent, or Firm*—Antonelli, Terry, Stout & Kraus, LLP.

(57) ABSTRACT

A reproducing apparatus having a function to recover synchronization and a function to display information. The first function resumes synchronous reproduction automatically even though synchronous reproduction is interrupted. The second function lets the user know what is going on in the reproducing apparatus when synchronous reproduction is interrupted.

7 Claims, 8 Drawing Sheets

REPRODUCTION APPARATUS AND REPRODUCTION METHOD

BACKGROUND OF THE INVENTION

The present invention relates to a reproduction apparatus and a reproduction method.

Examples of prior art technologies preceding the present invention are disclosed in Japanese Patent Laid-open Nos. 2002-125214 and 2001-188643.

SUMMARY OF THE INVENTION

New recording media typified by DVD have realized an easy way of selling or distributing contents such as movie. Now, users are able to replay such recording media at their convenient time by using a reproducing apparatus.

What is recorded in contents is video and audio information as well as additional information such as captions. Such additional information is reproduced and displayed simultaneously with image reproduction.

There has been proposed an idea of downloading additional information through a network so that captions of any language which are not recorded in a disk could be displayed. In this way it would be possible to obviate the necessity of previously recording captions in more than one language and hence it would be possible to reduce time and expense required for disk production. Information that can be downloaded also includes audio information for voice dubbing which is not previously recorded in a disk.

Downloading captions and audio information at any time according to the user's need eliminates the necessity of recording unnecessary data in a disk. This will help effectively utilize the limited recording capacity of a disk.

There is known a technology that permits the user to reproduce in real time video and/or audio information as he receives it through a network. This technology is called streaming. With streaming, the user can reproduce multimedia data (or video and audio data) while he is receiving them through a network such as the internet. In other words, streaming permits immediate reproduction before downloading of entire information regardless of the size of information. This leads to a conceivable way of reproducing contents recorded in a recording medium (or contents which has previously been downloaded through a network) simultaneously with contents which is being reproduced by streaming.

Incidentally, Patent Document Nos. 1 and 2 should be referred to for the technology of reproducing more than one contents simultaneously.

Reproducing video and audio information from streamed contents in synchronism with disk-recorded information or downloaded information sometimes depends on line congestion, line capacity, and CPU load.

That is, there would occur an unusual instance in which streaming does not keep up with reproduction of disk-recorded information or downloaded information when the network is congested. In such a case, the reproducing apparatus will be more convenient if it has a means to recover synchronization or to tell the user what is happening.

It is an object of the present invention to provide a reproducing apparatus which is so designed as to recover synchronization when there occurs an instance in which more than one kind of information cannot be reproduced in synchronism with each other and which is so designed as to tell the user how prescribed processes to recover synchronization are going on.

It is another object of the present invention to provide a reproducing apparatus and a reproducing method which are convenient for the user.

The object of the present invention is achieved by the reproducing apparatus and reproducing method as defined in the appended claims.

The reproducing apparatus and reproducing method according to the present invention are convenient for the user.

BRIEF DESCRIPTION OF THE DRAWINGS

These and other features, objects, and advantages of the present invention will become more apparent from the following description when taken in conjunction with the accompanying drawings, wherein:

FIG. 9 is a diagram showing one example of the screen display informing that the process to recover synchronous reproduction is going on.

DETAILED DESCRIPTION OF PREFERRED EMBODIMENTS

Figure 1:
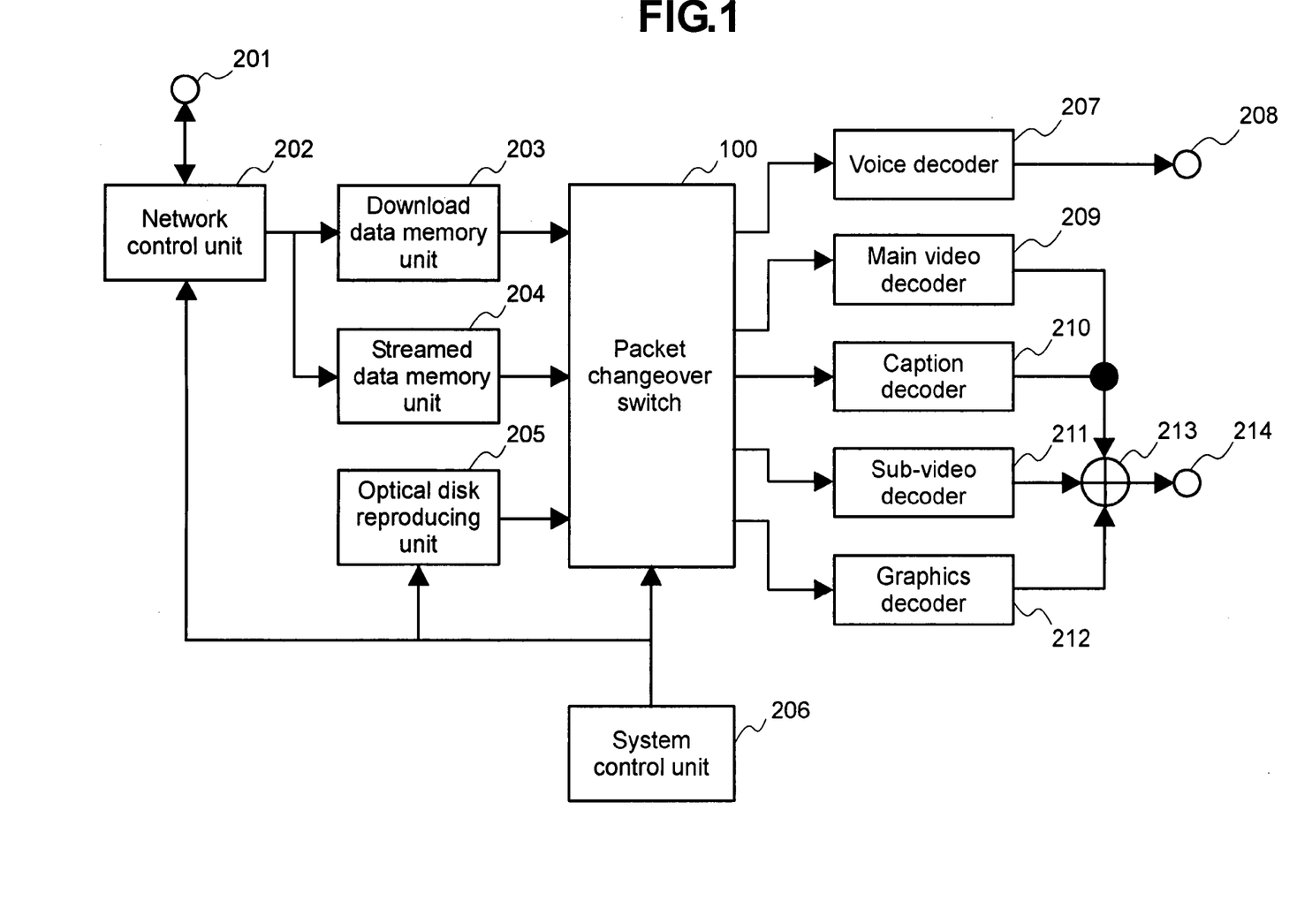
FIG. 1 is a block diagram showing the structure of the reproducing apparatus.

The reproducing apparatus as one embodiment of the present invention is shown in FIG. 1 which is a block diagram.

In FIG. 1, there are shown a packet changeover switch 100, a network input/output terminal 201, a network control unit 202, a downloaded data memory unit 203, a streamed data memory unit 204, an optical disk reproducing unit 205, a system control unit 206, a voice decoder 207, a voice output terminal 208, a main video decoder 209, a caption decoder 210, a sub-video decoder 211, a graphics decoder 212, a video synthesizing unit 213, and a video output terminal 214.

The reproducing apparatus shown in FIG. 1 is constructed such that the downloaded data memory unit 203 and the streamed data memory unit 204 are separate from each other. However, these two units may be combined into one local storage.

Figure 2:
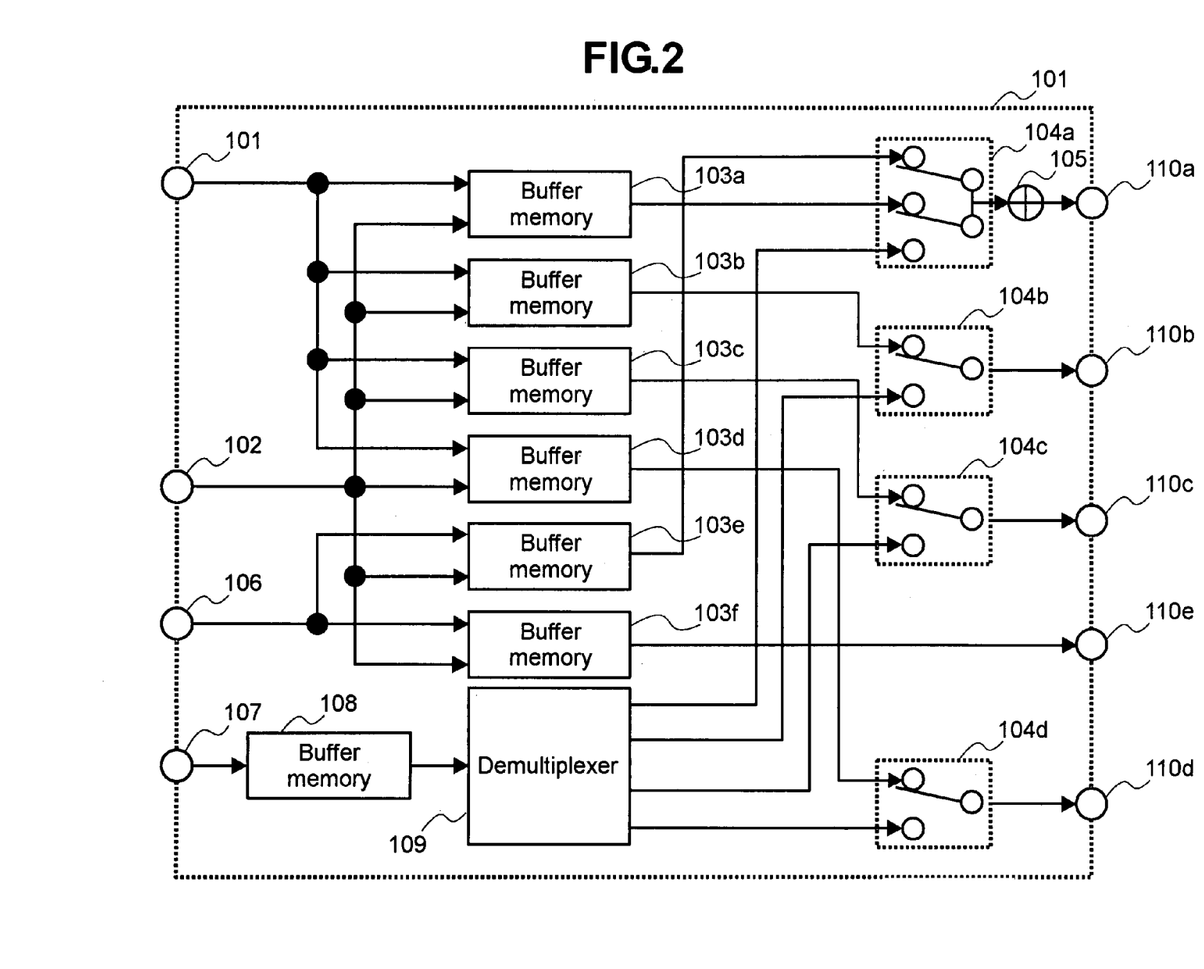
FIG. 2 is a block diagram showing the structure of the packet changeover switch.

FIG. 2 is a block diagram showing the packet changeover switch 100 shown in FIG. 1.

In FIG. 2, there are shown the packet changeover switch 100, a download-stream input terminal 101, a control signal input terminal 102, a buffer memory 103, a changeover switch 104, a voice synthesizing unit 105, a streaming data input terminal 106, a reproduction stream input terminal 107, a buffer memory 108, a demultiplexer 109, and a packet output terminal 110.

There are also shown a buffer memory 103 that buffers the voice stream, a changeover switch 104a that classifies the voice packets, and a voice packet output terminal that gives out the voice packet. Those components 103b, 104b, and 110b constitute the video packet output circuit. Similarly, those components 103c, 104c, and 110c constitute the graphics packet output circuit. The component 110e is an output terminal that gives out the streamed video information as a subimage.

Figure 3:
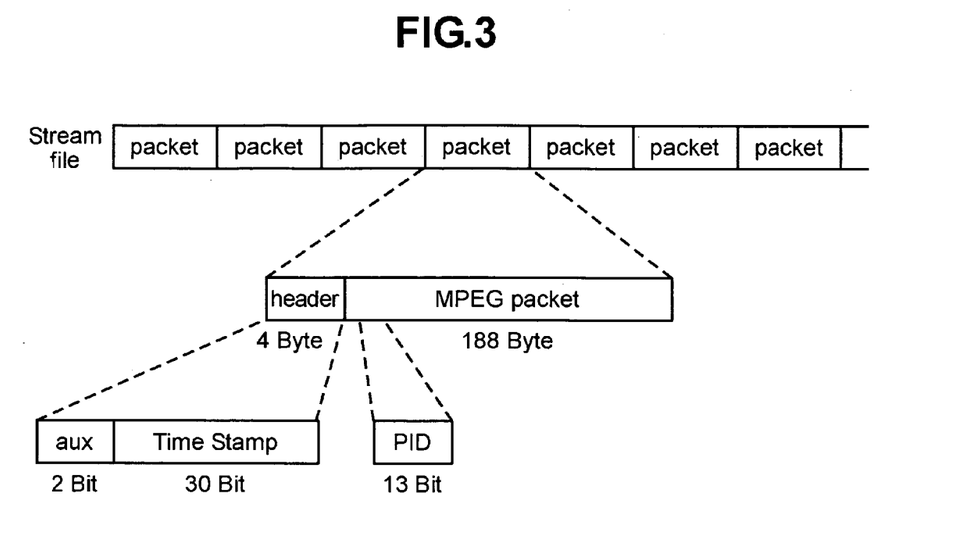
FIG. 3 is a diagram showing the structure of the stream and packet.

FIG. 3 shows the stream file data with which this embodiment is concerned.

The stream file data stored in the disk is a 188-byte MPEG packet combined with 4-byte header information, with the latter including a 30-bit time stamp (temporal information).

MPEG packets are not always transmitted consecutively at all times. Their intervals are expanded when the amount of data is small and their intervals are narrowed when the amount of data is large. At the time of stream file recording, the time at which each MPEG packet was recorded is also recorded in terms of time stamp added to each packet. At the time of reproduction, the output timing of each packet is adjusted by using this time stamp in order to reproduce the transmission intervals of packets.

Incidentally, each MPEG packet has at its head a 13-bit packet identifying number called PID (Packet Identifier). This PID varies according to the kind of packet. By reading this PID, it is possible to easily know what kind of information each packet carries.

It is assumed that the stream data to be handled in this embodiment, which includes any data stored on an optical disk, any data to be downloaded through a network, and any data for streaming, have the data format shown in FIG. 3. However, any other data format will also produce the effect of the present invention.

Incidentally, the description herein uses three different terms: (1) data stored in a disk-type recording medium, (2) downloaded data, and (3) streaming data. The first term denotes any stream data, such as previously recorded images and voices. The second term denotes any stream data, such as images and voices received through a network, which has been accumulated in a local storage, such as HDD (Hard Disk Drive). The third term denotes any data which is reproduced as it is received when stream data (such as images and voices) is viewed and listened through a network. There is no difference in data format between the streaming data and the downloaded data. The former is designed to be reproduced while data is being received, and the latter is designed to be reproduced after entire data has been received. They are regarded as different only because they are reproduced in different manners.

The reproducing apparatus of this embodiment reproduces data in three different manners as follows according to the kind of data.

(1) Reproduction of data recorded in a disk-type recording medium, which is an optical disk in this embodiment.

An optical disk storing such contents as movie is set on the optical disk reproducing unit 205. The contents contain information about images, voices, and captions to be reproduced.

To start reproduction, the user enters a command to start reproduction by means of the reproduction button on the reproducing apparatus or the remote control. Upon receipt of the command to start reproduction through a remote control signal receiver (not shown), the system control unit 206 starts actions to reproduce information from the optical disk.

To be concrete, the system control unit 206 reads file control information recorded in the disk. The file control information includes file names (file identifiers) of all the files recorded in the disk, positions of record starting sectors of each file, data length of each file, and additional information about each file. These data permit the information recorded in the optical disk to be handled as files.

After acquisition of file control information, the system control unit 206 sequentially reads files necessary for contents reproduction. These files include the play list file indicating the order of file reproduction, the menu information file to display a menu screen, and the stream file having the actual stream recorded therein.

The system control unit 206 displays the menu screen in response to the menu information file, so that the user selects the stream file from the displayed menu.

Reproduction of the selected stream file proceeds as follows. The optical disk reproducing unit reads the stream file from the optical disk and enters it (as the stream data) into the buffer memory 108 through the reproduction stream input terminal 107 of the packet changeover switch.

The stream data which has been entered into the buffer memory 108 is output from it in response to the timing of the time stamp added to each packet of the stream data, so that it is entered into the demultiplexer 109 in the form of 188-byte MPEG packets, with the stream data removed.

The demultiplexer 109 separates each of the entered packets into video information, audio information, caption information, and graphics information according to the PID (packet identification number) and then gives them out. Each MPEG packet has a 13-bit PID at its head as shown in FIG. 3, and this PID is used for packet separation. Incidentally, it is assumed that the correspondence between each PID and information is previously established. In other words, information (such as video information and audio information) has its inherent PID, so that the demultiplexer reads the PID of the entered information and separates the information according to the PID.

The information which has been separated by the demultiplexer is sent to the output terminal 110 through the changeover switch 104. The changeover switch 104 is so controlled as to select the output from the demultiplexer for reproduction of data on the optical disk. Each piece of information separated by the demultiplexer is sent to different output terminals as follows.

The packet which has been separated as audio information by the demultiplexer is sent to the changeover switch 104a, which selects the input for main voice or subvoice. Here, it is only necessary to select the input for main voice from the output of the demultiplexer because only the optical disk is being reproduced. Then the voice information is sent to the voice output terminal 110a through the voice synthesizing unit 105. The voice synthesizing unit 105 combines main voice and subvoice into a single piece of voice information. However, this process is omitted if there exists only main voice. The voice information packet coming out of the voice output terminal 110a enters the voice decoder 20, which decodes the voice information packet and gives out the result (as voice signal) through the voice output terminal 208.

The packet which has been separated as image information by the demultiplexer enters the changeover switch 104b and then enters the main video decoder 209 through the video output terminal 110b.

Similarly, the caption information enters the caption decoder 210 through the output terminal 110c and the graphics data enters the graphics decoder 212 through the output terminal 110d.

The video data decoded by the main video decoder 209, the caption data decoded by the caption decoder 210, and the graphics data decoded by the graphics decoder 212 are combined (superimposed) into a single video signal by the image synthesizing unit 213, and the resulting video signal is sent out to the video output terminal 214 so that it is displayed on the external television monitor.

Data of different kinds recorded on an optical disk is reproduced in the above-mentioned manner and the reproduced data is given out as audio signals and video signals.

(2) Reproduction of Downloaded Data:

The data downloaded from a network is reproduced in the following manner.

To acquire his favorite contents, the user needs to download data through a network. The contents is composed of video information, audio information, and caption information, in combination or individually, in any manner.

To start downloading, the user depresses the remote control button, thereby sending a download start command to the system control unit 206.

Upon reception of a download start command, the system control unit makes connection to the server on which is stored the contents to be downloaded. Connection is achieved by using the download information such as server's URL (Unified Resource Locator).

There are conceivable ways to obtain the download information. For example, the user may obtain it from the contents supplier when he purchases his favorite contents. Alternatively, the purchaser of the contents may obtain the download information which has previously been recorded together with the contents on an optical disk. In the latter case, the purchaser of the contents may also obtain (by downloading) additional data that will make the contents more enjoyable.

The server on the network has a list showing the downloadable data, so that the user can select from the list the information he wants to download.

The information selected by the user is transmitted from the server through the network. The network control unit 202 stores the received information in the downloaded data memory unit 203.

The downloadable data includes video information, audio information, caption information, and graphics information. They can be downloaded all at once or individually according to the user's preference. The downloaded data is stored in the downloaded data memory unit 203.

The downloaded data memory unit 203 may be a magnetic recording medium such as HDD or a semiconductor recording medium such as RAM (Random Access Memory) or flash memory. It is not specifically restricted in its type.

The downloaded data is stream data like the data recorded in an optical disk, and it is coded in the form of MPEG packet containing a time stamp.

Upon completion of downloading, the user is ready to reproduce the downloaded data.

The downloaded data may be reproduced alone or (in many cases) in synchronism with other contents. The following is concerned with the synchronous reproduction of video information and graphics information which are held in an optical disk and the synchronous reproduction of audio information and caption information which have been downloaded and held in the downloaded data memory unit 203. Such synchronous reproduction will be necessary when the user wants to view the contents (images and graphics) of an optical disk containing Japanese caption and voice while viewing and listening to English caption and voice which are separately downloaded.

First, the user depresses the reproduction start button on the remote control, thereby entering a command to start reproduction of an optical disk. The system control unit receives the reproduction start command from the user and starts reproduction. It asks the user whether or not he wants synchronous reproduction because the downloaded data has already been recorded in the downloaded data memory unit 203. If the user selects synchronous reproduction, the system control unit reproduces the downloaded data (stored in the data memory unit) in synchronism with reproduction of data in the optical disk.

Stream files from the optical disk are reproduced. The reproduced stream files are entered into the buffer memory 108 through the reproduced stream input terminal 107 of the packet changeover switch. The stream file data, which has entered the buffer memory, subsequently enters the demultiplexer 109 with timing in response to the time stamp. Then, it is divided into sections according to PID, and the divided sections enter the respective changeover switches.

On the other hand, of the data stored in the downloaded data memory unit 203, those which are specified for synchronous reproduction are read from the data memory unit and entered into the buffer memory 103 through the download stream input terminal 101 of the packet changeover switch 100.

The packet changeover switch has several buffer memories, and the system control unit specifies the buffer memory for writing through the control signal input terminal 102. In other words, the system control unit controls reading of data from the data memory unit and writing to the buffer memory at the same time.

Of the downloaded data, voice information and caption information undergo synchronous reproduction. The stream file for voice information is written in the buffer memory 103a and the stream file for caption information is written in the buffer memory 103c. This procedure is carried out such that no overflow takes place in the buffer memory 103. In other words, data is read from the data memory unit by time sharing and then written in the buffer memory.

The buffer memory 103a for voice information controls the output timing of voice packets in response to the time stamp of each packet of the written voice information stream file. The voice information packet enters the changeover switch 104a through the buffer memory according to the prescribed timing. At this time, the voice information packet has its 4-byte header (including the time stamp) removed.

Similarly, the buffer memory 103c for caption information controls the output timing of each packet of the caption information stream and enters caption information packet into the changeover switch 104c.

On the other hand, the stream file reproduced from the optical disk enters the buffer memory 108 through the reproduction stream input terminal 107. The buffer memory 108 gives out the packet according to the prescribed timing in response to the time stamp added to each packet.

Here, the stream file which has been reproduced from the optical disk is multiplexed with the video information packet, audio information packet, caption information packet, and graphics information packet.

The stream packet from the buffer memory 108 enters the demultiplexer according to the prescribed timing in response to the time stamp. The demultiplexer undoes the multiplexing of the entered stream packet, separates information packets, and enters them into their corresponding changeover switches 104.

The changeover switch 104 selects outputs from the buffer memory 103 in the case of data for synchronous reproduction. It also selects data from the demultiplexer 109 for reproduction of data from the optical disk. The changeover switch is controlled by the system control unit 206.

For reproduction of downloaded data (which are voice information and caption information) and optical disk's data (which are video information and graphics information)., the changeover switch 104a for voice information and the changeover switch 104c for caption information are set to the buffer memory and the changeover switch 104b for video information and the changeover switch 104d for graphics information are set to the demultiplexer.

Thus the changeover switch 104a selects the output from the buffer memory 103a and enters it into the voice decoder 207. In other words, the downloaded voice data, which has been stored in the downloaded data memory unit 203, is entered and decoded into voice signal and then it is sent to the voice output terminal 208. In this example, what is given out as voice is only the downloaded voice data which has been stored in the downloaded data memory unit 203 and hence nothing is processed in the voice synthesizing unit 105.

The output from the demultiplexer 109 is selected by the changeover switch 104b and entered into the main video decoder 209. In other words, the image data reproduced from the optical disk is decoded and the result as image signals is entered into the video synthesizing unit 213.

The output from the buffer memory 103c is selected by the changeover switch 104c and entered into the caption decoder 210. In other words, the downloaded caption data, which has been stored in the downloaded data memory unit 203, is entered and decoded and the result as caption image signals is entered into the video synthesizing unit 213.

The output from the demultiplexer 109 is selected by the changeover switch 104d and entered into the graphics decoder 212. In other words, the graphics data reproduced from the optical disk is entered and decoded and the result as graphics image signal is entered into the video synthesizing unit 213.

The video synthesizing unit 213 receives the decoded image signal, caption image signal, and graphics image signal and performs the superimposing process to produce the image signals. The image signals are sent out from the image signal output terminal 214 to be displayed on an external TV monitor.

In this way, the downloaded data is reproduced in synchronism with the data reproduced from the optical disk. At this time, it is possible to easily switch between the downloaded data and the data reproduced from the optical disk by controlling the changeover switch 104. The buffer memories 103 arranged in parallel permit simultaneous output for individual streams. This makes it possible to give out more than one downloaded stream at the same time.

Incidentally, the description in this embodiment is based on the assumption that the recording medium for contents is an optical disk. However, any recording media such as magnetic ones and semiconductor ones may also be used.

The reproducing apparatus shown in FIG. 2 is comprised of the optical disk reproducing unit and the data memory unit as separate blocks. However, the former may function as the latter or vice versa. For example, the optical disk may be provided with a recording region for data storage. In this case, the stream data which has previously been recorded on the disk and the downloaded stream data are read by time-sharing and the read data is entered into the packet changeover switch 100.

As mentioned above, the present invention is applicable to any kind of recording media.

(3) Reproduction of Streaming Data:

Streaming data is reproduced in the following manner.

The term "streaming data" as used herein is defined as any data that gives an additional value by streaming in synchronism with reproduction of data recorded in the optical disk. In other words, the image obtained by reproduction of the data recorded in an optical disk is the main image and the image obtained by reproduction of the streaming data is the subimage.

In actual operation, a small screen appears in a specific scene during reproduction of data recorded in an optical disk and the streamed data is reproduced in the small screen. Such a small screen may be used, for example, to introduce the movie director's unknown episode while the movie recorded in an optical disk is being reproduced.

The streaming data corresponds to the main image for synchronous reproduction one to one, because it is prepared by one who provides the data of the main image to increase the joy of the main image. Therefore, correspondence between the main image data and the streaming data is ensured easily and certainly.

It is possible to reproduce the streaming data in synchronism not only with the data recorded in the optical disk but also with the data which has previously been downloaded into the downloaded data memory unit 203. However, it is also possible to reproduce the streaming data alone.

Synchronous reproduction is accomplished in the following way for the information recorded in an optical disk and the streamed information.

Figure 4:
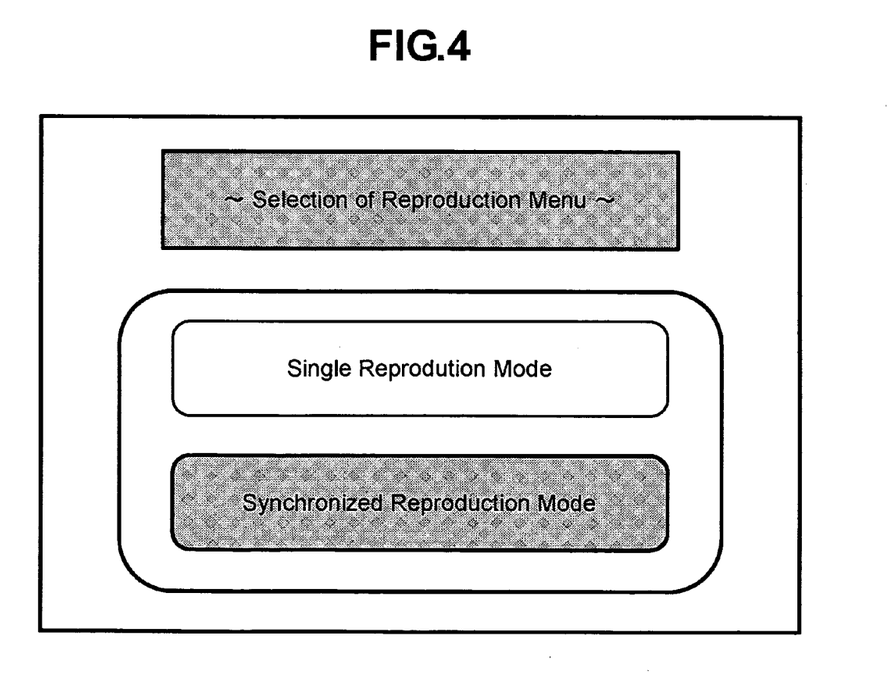
FIG. 4 is a diagram showing one example of the screen that prompts the user to select the reproduction menu.

To start synchronous reproduction, the user depresses the reproduction button on the main body or remote control of the reproducing apparatus. Upon reception of the command to start reproduction, the system control unit 206 starts reproduction of information from the optical disk. At this time, a menu appears on the screen as shown in FIG. 4, prompting the user to select the mode of reproduction—the information recorded in the optical disk should be reproduced independently or in synchronism with the streaming data. Here the user selects the mode of synchronous reproduction.

When the mode of synchronous reproduction is selected, the system control unit 206 makes connection to the server on the network on which the streaming data is stored. The streaming data has its unique URL. As soon as connection to the network is established, the system control unit is ready for streaming and starts reproduction of data from the optical disk.

Figure 5:
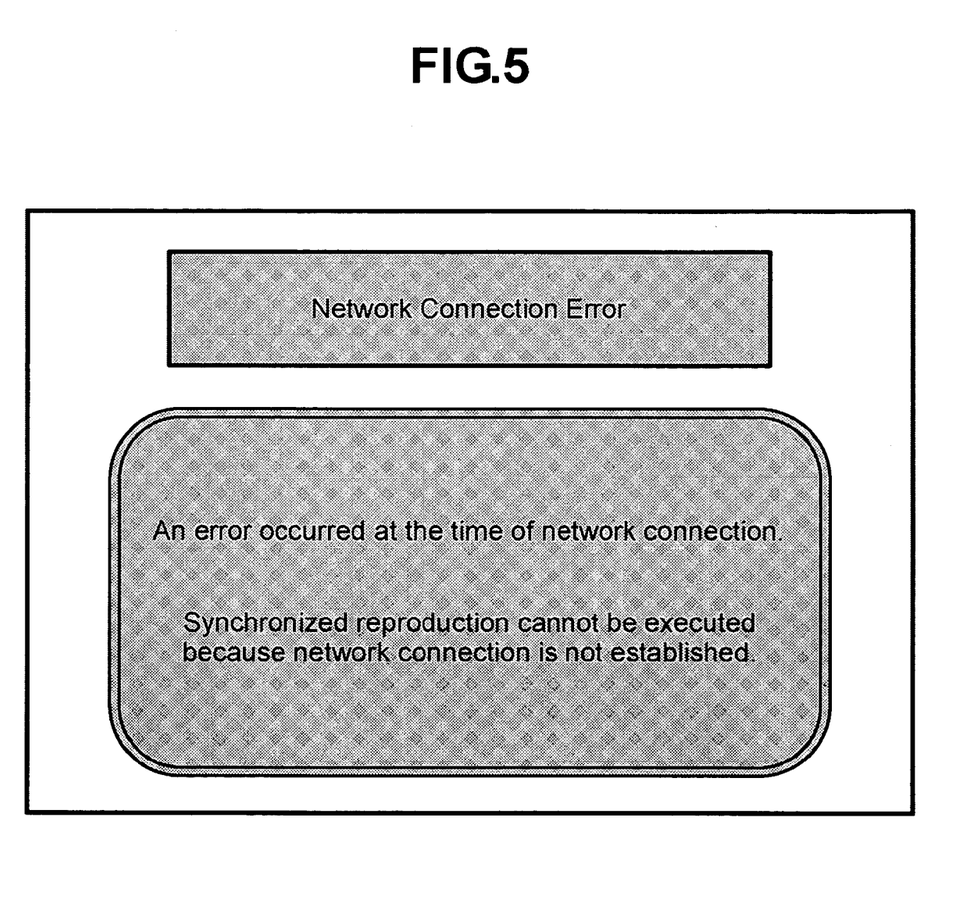
FIG. 5 is a diagram showing one example of the screen informing that an error has occurred in network connection.

If connection to the network is not established due to troubles in the network, a notice appears on the screen as shown in FIG. 5, telling the user that troubles have occurred in the network. Then, the system control unit reproduces independently the information recorded in the optical disk or tries again to establish connection to the network or repeats this procedure until connection to the network is established. Alternatively, the system control unit may try to establish connection to the network periodically while reproducing the optical disk independently. Which procedure to take may be selected by the user. The URL mentioned above may be previously recorded in the optical disk if it is established when the optical disk is sold. Otherwise, the URL may be informed to the purchaser of the optical disk by mail.

It might be troublesome to make selection as shown in FIG. 4 each time the commend to start reproduction is issued. So, a menu is displayed on the screen asking the user whether or not he wants synchronous reproduction. In this case, the system control unit which has received the command to start reproduction checks to see whether or not the previously set synchronous reproduction should be performed. If it decides not to perform synchronous reproduction, it starts reproduction of the optical disk; if it decides to perform synchronous reproduction, it makes connection to the desired URL and starts preparation for streaming. The process obviates the necessity of making selection as shown in FIG. 4 each time the command to start reproduction is issued.

After having established connection to the network and getting ready for streamlining, the system control unit starts reproduction of the stream file from the optical disk. The procedure for reproduction of the stream file from the optical disk is the same as mentioned above, and hence its description is omitted here.

For network reproduction at this time, the system control unit 206 successively transmits the state of stream reproduction of the optical disk to the server through the network control unit 202 and the network input/output terminal 201. Upon reception of the state of stream reproduction, the server judges, according to the state of reproduction, whether or not to transmit the streaming data to the reproducing apparatus. There is an alternative procedure as follow depending on the state of reproduction. The reproducing apparatus requests the server for data, and the server transmits data in response to the request. The state of stream reproduction to be transmitted may include information about the position of reproduction (in terms of hours, minutes, and seconds) from the head of the stream. Any other information is also acceptable so long as it permits streaming to be synchronized with stream reproduction of the optical disk. Upon reception of such information, the server (which knows the transmitting timing for streaming data) transmits the streaming data to the reproducing apparatus when the information about the state of reproduction agrees with the transmitting timing for the streaming data. Otherwise, it does not transmit the streaming data.

The streaming data which has been transmitted from the server on the network is stored in the streamed data memory unit 204 (which is not specifically restricted in its type as in the case of the downloaded data memory unit 203).

The data which has been stored in the streamed data memory unit 204 enters the buffer memory 103 through the streaming data input terminal 106 of the packet changeover switch 100. At this time, the audio information stream file is written in the buffer memory 103e and the video information stream file is written in the buffer memory 103f. These actions are accomplished by reading from the data memory unit by means of time-sharing and writing into the buffer memory so that overflow will not occur in the buffer memory 103.

The system control unit 206 periodically checks to see the state of data accumulation in the buffer memory 103 at the time of stream reproduction of the optical disk and synchronous reproduction of streaming. If data accumulation in the buffer memory 103 is found, the accumulated data is decoded because it has been transmitted with the timing for synchronous reproduction by the server on the network properly judged.

Voice decoding is accomplished in the following manner. The changeover switch 104a is set so that it receives the output from the buffer memory 103e and the output from the demultiplexer 109. The changeover switch 104a leads voice read from the optical disk and voice accumulated in the buffer memory 103e to the voice synthesizing unit 105 in which two voices are combined, and the combined voice is given out from the voice output terminal 110a and is entered into the voice decoder 207. The voice decoder decodes the voice information packet which has been entered and then gives out the result of decoding (as voice signal) from the voice output terminal 208.

Image decoding is accomplished in the following manner. The changeover switch 104b is set so that it receives output from the demultiplexer 109. The changeover switch 104b gives out the image information read from the optical disk to the main video decoder 109 through the image output terminal 110b. The image information accumulated in the buffer memory 103f is sent to the subvideo decoder 211 through the subvideo output terminal 110e. The caption decoder 210 selectively receives output from the demultiplexer 109 through the changeover switch 104c. In other words, caption data read from the optical disk is entered. The graphics decoder 212 selectively receives output from the demultiplexer 109 through the changeover switch 104d. In other words, graphics data reproduced from the optical disk is entered.

The information which has been entered into and decoded by the decoders 209 to 212 undergoes superposition by the video synthesizing unit 213, and the results are output from the video signal output terminal 214 and displayed on an external TV monitor.

The foregoing is the process for reproducing streamed data in synchronism with data reproduced from the optical disk. This embodiment is designed to display the image reproduced from the optical disk (as the main image) in synchronism with the streamed image (as the subimage). The voice information from the optical disk and the voice information from the streamed data are combined into one information, which is output in synchronism with the image information.

The controlling method mentioned herein may fail to synchronize streamed data with data from the optical disk when smooth streaming is impossible due to network congestion. In addition, it cannot take necessary steps for recovery or inform the user in case of failure of synchronization because the system control unit 206 does not recognize whether or not streaming is taking place smoothly.

Therefore, more complex control is required as explained in the following.

The system is constructed such that the server on the network (which transmits streaming data) and the reproducing apparatus (which receives streaming data) mutually recognize the start of transmission of streaming data. To be concrete, when starting transmission of streaming data, the server on the network transmits information about start of data transmission to the reproducing apparatus. Upon reception of this information, the reproducing apparatus turns ON the streaming execution flag. The system control unit 206 periodically checks the state of the streaming execution flag. If the flag is ON, it executes streaming and synchronous reproduction of the optical disk. If the flag is OFF, it does not execute streaming but reproduces only the optical disk.

When transmission of streaming data is completed, the server on the network sends information to the reproducing apparatus. Upon reception of this information, the reproducing apparatus turn OFF the streaming execution flag. Notice of start and completion of transmission of streaming data is transmitted each time the main vide is reproduced in synchronism with the subvideo. For example, if the subvideo is to be synchronized while the stream of the main video is being reproduced from point A to point B and from point C to point D, the notice for start of transmission of streaming data is sent in synchronism with start of reproduction of point A and the notice for end of transmission of streaming data is sent when reproduction up to point B is completed. Similarly, the notice for start of transmission is sent in synchronism with point C and the notice of end of transmission is sent in synchronism with point D.

Figure 6:
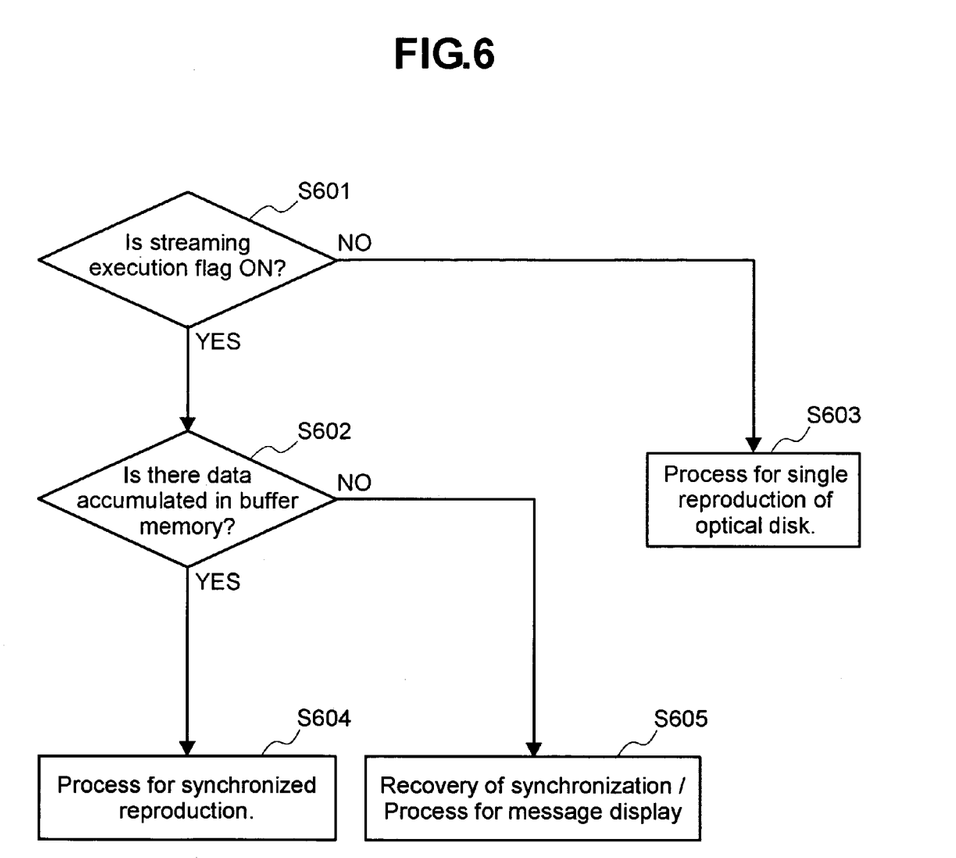
FIG. 6 is a flow sheet for the control of synchronous reproduction which uses data accumulation in the buffer memory.

Here the system control unit 206 checks to see the state of data accumulation in the buffer memory 103 as mentioned above. If data is accumulated in the buffer memory, the accumulated data is decoded sequentially because there is no delay in streaming. On the other hand, if data is not accumulated in the buffer memory even though the streaming execution flag is ON, it means that there is delay in streaming. In other words, it means that synchronization with reproduction of the optical disk is impossible. So, the system control unit 206 executes the procedure to recover synchronization or to inform the user of the failure of synchronous reproduction. The flow diagram for this procedure is shown in FIG. 6.

In addition, more complex control is made possible by application of the threshold value to the state of data accumulation in the buffer memory.

Figure 7:
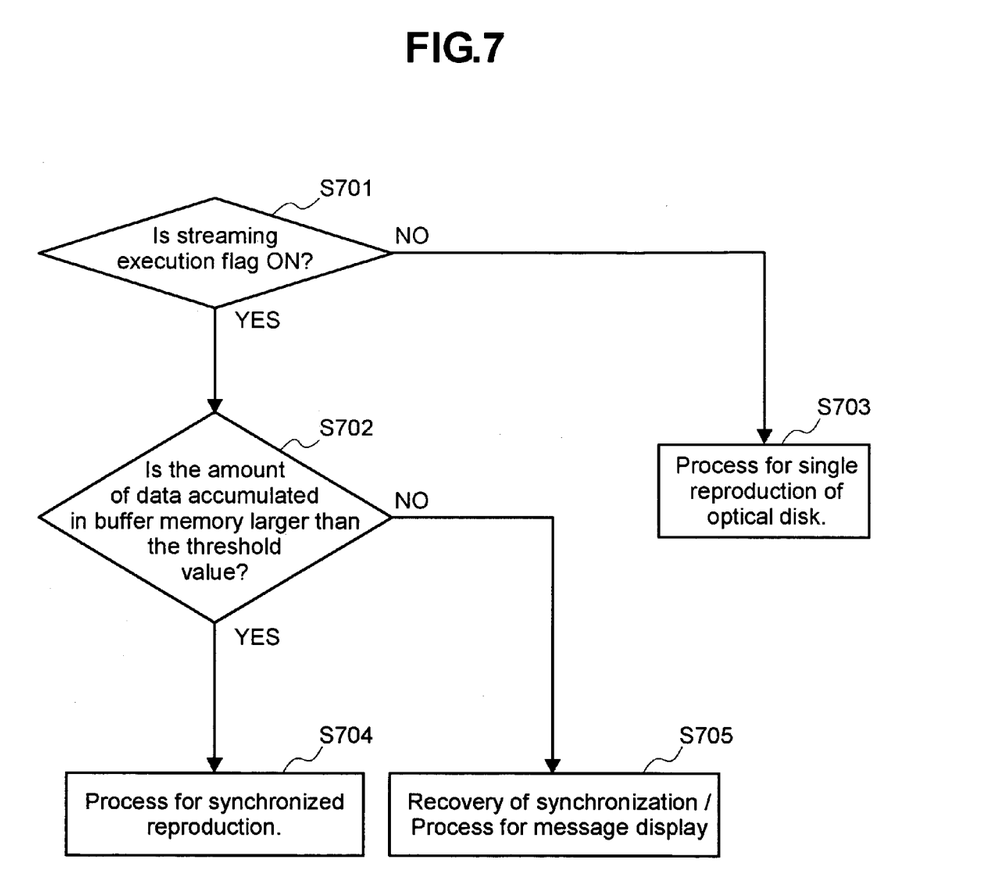
FIG. 7 is a flow sheet for the control of synchronous reproduction which uses the threshold value.

The following description is based on the assumption that the threshold value of 50% is established for the state of data accumulation in the buffer memory. The system control unit 206 checks to see the state of the streaming execution flag mentioned above. If the flag is ON, it checks to see the state of data accumulation in the buffer memory 103. Here it checks to see if the accumulated data in the buffer memory is greater than the previously established threshold value. If the accumulated data in the buffer memory is greater than 50%, it decodes the accumulated data and executes reproduction in synchronism with the optical disk. If the accumulated data is smaller than 50%, it executes the procedure for the failure of synchronous reproduction. The flow diagram for this procedure is shown in FIG. 7.

The system control unit 206 periodically checks the state of the streaming execution flag and the state of data accumulation in the buffer memory, and it takes necessary steps according to the result of checking. This ensures complex control.

Figure 8:
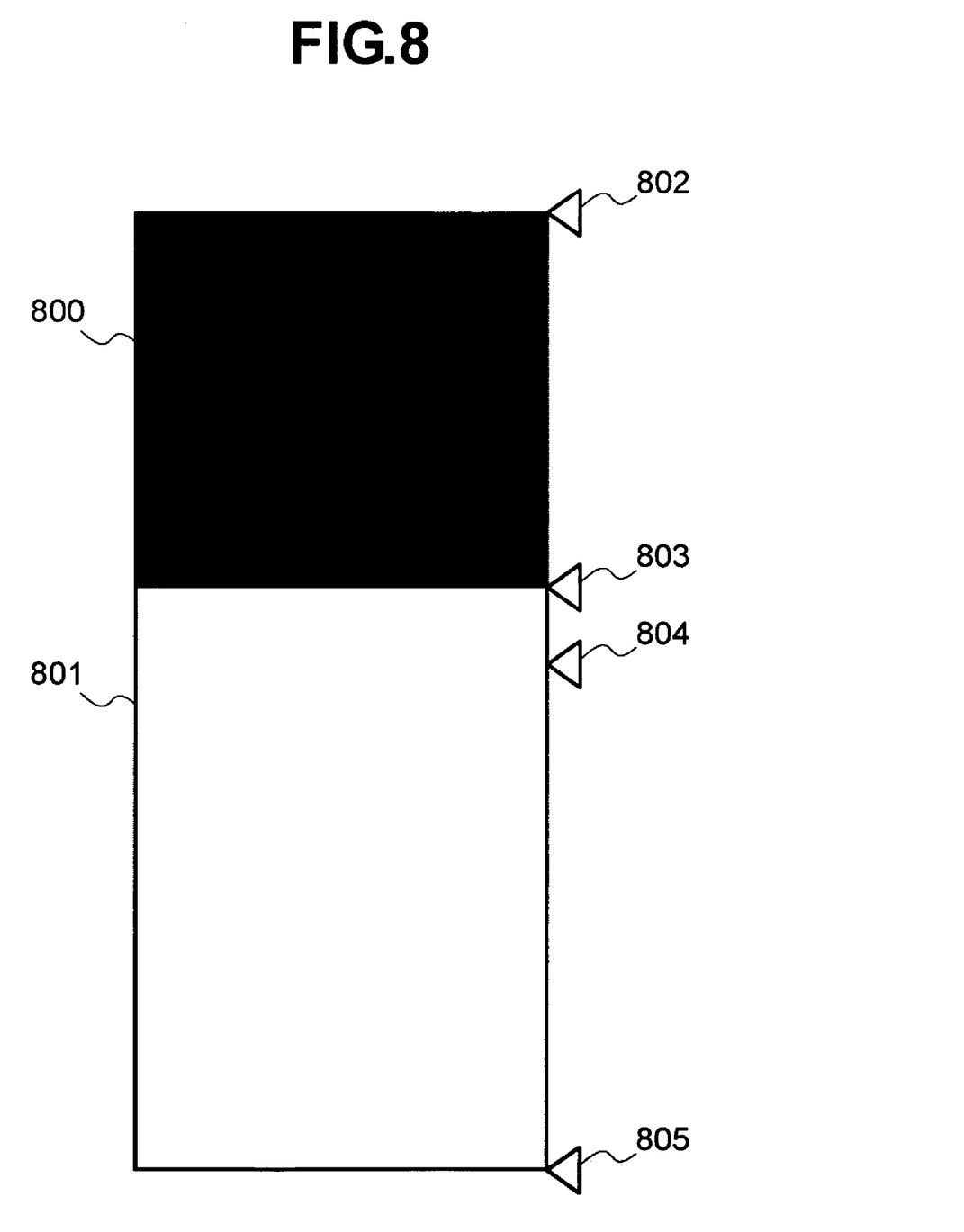
FIG. 8 is a diagram showing the state of data accumulation in the buffer memory.

FIG. 8 is a schematic diagram showing the buffer memory. In FIG. 8 there are shown buffer memory 800 and accumulated streaming data 801, and numerals 802, 803, 804, and 805 denote respectively the upper limit of buffer, the amount of accumulated data, the threshold value, and the lower limit of buffer. The system control unit 206 references the values of 802 to 805 to check the state of the buffer memory.

If 802=803, data is sequentially sent to the decoder from the buffer memory. However, since no more data can be accumulated, data reading from the data memory unit 204 is suspended. If 802>803>804, data is sequentially sent to the decoder from the buffer memory and data reading from the data memory unit 204 is continued. If 802>804>803 (in this case data is not yet accumulated to the threshold value), data is not sent to the decoder and data reading from the data memory unit 204 is continued. Also, if 803=805, decoding is not executed and data reading from the data memory unit 204 is continued.

The process shown in FIG. 6 proceeds as follows. If it is found at Step S602 that data is accumulated in the buffer memory, synchronous reproduction is carried out at Step S604; otherwise, recovery of synchronization is performed or notice of failure in synchronization is sent to the user at Step S605. The reproducing apparatus follows the foregoing procedure in the case where the threshold value is set at 100%. The threshold value is not specifically restricted. It may vary from one reproducing apparatus to another, or the reproducing apparatus may be provided with a function that permits the user to modify the threshold value. As the threshold value increases, synchronization becomes more sure. On the other hand, with a high threshold value, it takes a longer time for data to accumulate in the buffer memory, which hampers real-time reproduction. The lower the threshold value, the easier the real-time reproduction. In this case, however, failure in synchronization occurs frequently even when the rate of streaming data transmission decreases only slightly.

Consequently, the threshold value should be set high if the streaming data transmission rate is low or vice versa, depending on the state of the network. Alternatively, the threshold value should be set high if the user prefers reliable synchronous reproduction or the threshold value should be set low if the user places importance on real-time reproduction.

As mentioned above, it is desirable to set an adequate threshold value according to the user's preference or the state of network congestion.

The following procedure is employed to recover synchronization when synchronous reproduction fails due to network congestion and delayed transmission of streaming data. When the system control unit 206 judges from the state of data accumulation in the buffer memory that synchronous reproduction is impossible, it executes the procedure to recover synchronization.

The easiest way is to suspend reproduction of the optical disk until streaming data is accumulated above the threshold value. The actual process consists of stopping transmission of information (read from the optical disk) to the decoder, reading streaming data (transmitted from the server on the network) from the data memory unit 204, and continuing data accumulation in the buffer memory. After data has been accumulated up to the threshold value, two contents are reproduced in synchronism with each other. In this way it is possible to recover synchronization. While streaming data is being accumulated, with reproduction of the optical disk suspended, it is desirable to display a message to that effect. The content of the message and the method for displaying the message will be described later.

This method, however, will invite the user's dissatisfaction because it suspends reproduction of main images. Even though data accumulation in the buffer memory takes only a short time, it is not desirable to suspend reproduction of main images for subimages. The following is one way of recovering synchronization without suspending reproduction of main images.

The easiest way is to give up streaming without suspending reproduction of main images if synchronous reproduction is impossible to carry out. To be concrete, this object is achieved by continuing sending information (read from the optical disk) to the decoder and, at the same time, sending a message to the server on the network informing that transmission of streaming data is suspended. Also, at this time, the streaming execution flag (mentioned above) is turned OFF and accumulated data in the buffer memory is discarded. When display of subimages is suspended as the result of this procedure, the user will not know what happens. So, a message is displayed to tell the user why reproduction of subimages has been suspended.

There is an alternative method when synchronous reproduction become impossible. It consists of accumulating streaming data while suspending reproduction of main images intermittently (by the way mentioned above) instead of giving up streaming. If it is still necessary to suspend reproduction of main images frequently despite the foregoing procedure, the system gives up streaming after informing the user to this effect. The frequency of suspending reproduction of main images, according to which the system gives up streaming, should be predetermined for each reproducing apparatus. For example, the reproducing apparatus may be set such that it gives up streaming if reproduction of main images is suspended five times within two minutes.

Once the system gives up streaming, it does not need to recover synchronization until reproduction of the optical disk is completed. However, it is desirable for the user to recover synchronization. When to recover synchronization varies depending on circumstances. Possible timing is the start of a new chapter or the change of the scene. Another possible timing is the elapse of N seconds after the system has given up or the start of I picture which is N pictures ahead. In any case, it is necessary to exchange information between the server on the network which transmits the streaming data and the reproducing apparatus which controls synchronization recovery.

The following illustrates an example of information exchange between the server on the network and the reproducing apparatus.

When the reproducing apparatus judges that it is incapable of synchronous reproduction, it sends signals to the server on the network informing that it suspends transmission of streaming data. Then it sends signals asking for transmission of streaming data for resumption of synchronous reproduction, and the server on the network prepares data transmission according to such signals. In this case, both parties use previously agreed commands and execute necessary steps according to such commands. For example, "command A" may specify the time at which a new chapter starts and "command B" may specify the time N seconds later at which synchronous reproduction resumes, with N being a parameter to be specified. Incidentally, the giving and receiving of this command may be omitted. The server on the network knows that the reproducing apparatus is incapable of synchronous reproduction when it receives signals informing that transmission of streaming data from the reproducing apparatus is suspended. This is because, if synchronous reproduction is achievable, the server notifies the reproducing apparatus of start and stop of transmission of streaming data and the server never receives this information from the reproducing apparatus. Thus, it is only necessary for the server on the network to make preparation for data transmission to resume synchronous reproduction when it receives this information. In this case, however, the server on the network does not yet receive any request from the reproducing apparatus for the position where synchronous reproduction should be resumed, and hence it cannot transmit data to comply with the request. Therefore, it is possible that the server on the network decides where to resume synchronous reproduction and informs the reproducing apparatus of what has been decided. Of course, it is also possible to previously determine when to resume synchronous reproduction (or the timing for resumption of synchronous reproduction in case synchronous reproduction becomes unachievable) between the two parties.

Incidentally, the data for resumption of synchronous reproduction which is sent from the server on the network starts when or before synchronous reproduction is resumed. For example, in the case where synchronous reproduction becomes unachievable and synchronous reproduction is resumed N seconds later, the server on the network sends the information to the reproducing apparatus as soon as it becomes ready to transmit data for resumption of synchronous reproduction. Upon reception of the data, the reproducing apparatus accumulates the data in the buffer memory and decodes the accumulated data at the same time as synchronous reproduction is resumed N seconds later and performs reproduction in synchronism with reproduction of the optical disk. Sending data before the start of synchronous reproduction in this manner ensures synchronous reproduction. If there is an additional capacity to spare in the network and CPU, it is desirable to accumulate data of subimages in parallel with controlling reproduction of contents. This method is effective in the case where streaming tends to delay.

Also, for example, in the case where the amount of data accumulated in the buffer memory is expected to decrease to such an extent that synchronous reproduction becomes unachievable soon, there is a conceivable way of control to temporarily suspend reproduction of main images and subimages when the scene changes and accumulate data in the buffer memory during this period. In this case, reproduction is suspended temporarily but there is a margin in data accumulation, which ensures synchronous reproduction.

Also, the reproducing apparatus has a function to temporality suspend reproduction. This function is usually promised on an assumption that reproduction of main images is suspended. However, when the function for temporary suspension works during reproduction of main images and subimages, reproduction of not only main images but also subimages is suspended temporarily. Incidentally, data accumulation in the buffer memory may be carried out during temporary suspension. Of course, when temporary suspension is released, synchronous reproduction is resumed. In other words, the user's action on main images is associated with control over subimages.

In addition, the reproducing apparatus may have a function that permits the user to stop or temporarily suspend only reproduction of subimages.

Of course, the reproducing apparatus would be convenient for the user if it has a function that permits the user to select what to reproduce preferentially when synchronous reproduction becomes unachievable. For example, the reproducing apparatus should preferably have a function that permits the user to continue reproduction of main images but give up streaming or to carry out synchronous reproduction at a sacrifice of suspending reproduction of main images.

Also, the reproducing apparatus may be constructed such that synchronous reproduction is performed on any contents for the first reproduction of contents in the optical disk but synchronous reproduction is performed for the second and subsequent reproduction. For example, at the time of reproduction of the optical disk, the ID inherent in the optical disk being reproduced is associated with the number of reproductions and the result is stored in the RAM (Random Access Memory) built into the system. The reproducing apparatus checks to see the thus stored information when it starts reproduction and performs single reproduction on the optical disk in the case of the first reproduction and performs synchronous reproduction in the case of the second and subsequent reproduction. The effect is that the user enjoys the contents of the optical disk at least once without any interference. Moreover, the user will have another joy different from the first one at the second and subsequent time for synchronous reproduction of subimages. The user will not have a serious dissatisfaction even though synchronous reproduction is impossible for some reasons and reproduction of main images has to be suspended, because he has already viewed the main images once.

In the case where synchronous reproduction becomes unachievable, a message to this effect is given to the user as described in the following.

The reproducing apparatus according to the present invention displays a message informing the user of what is happening when streaming does not proceed smoothly and synchronous reproduction becomes unachievable on account of network congestion. It also displays any massage whatsoever when the action which the user wants is not executed.

Figure 9:
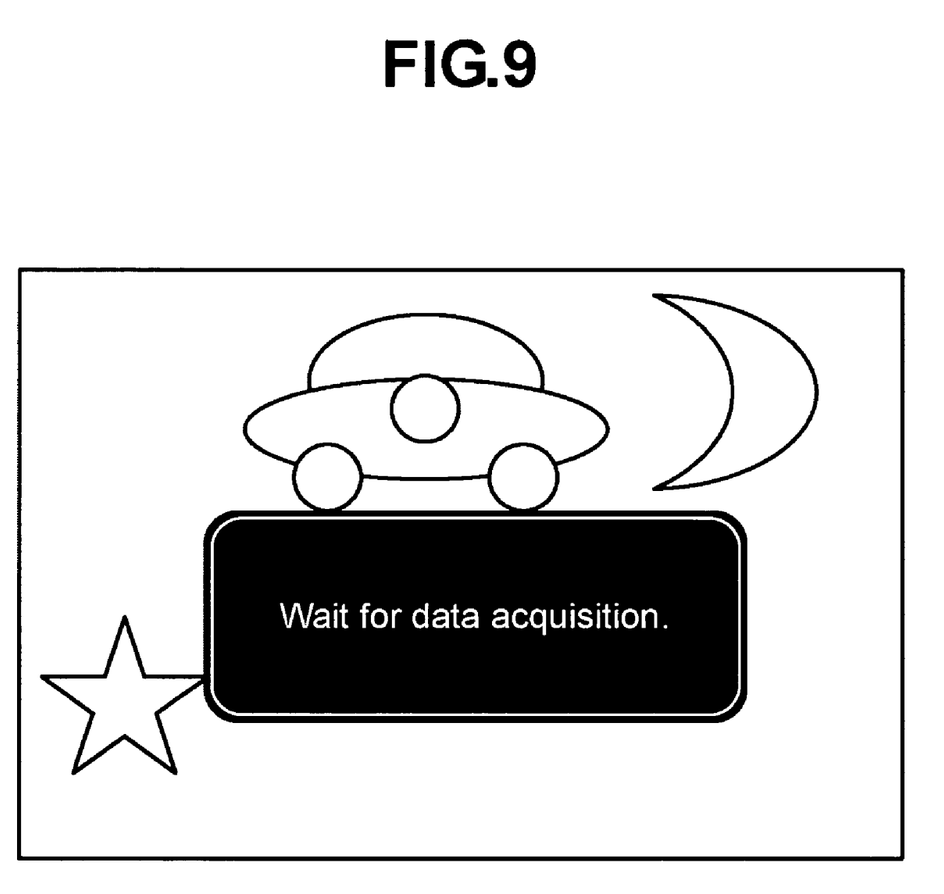

FIG. 9 shows an example of such a message, which is displayed when synchronous reproduction becomes unachievable while streaming data and data read from the optical disk are being reproduced in synchronism with each other. In this case, reproduction of streaming (as subimages) does not keep up with reproduction of the optical disk (as main images) and hence the display of main images is temporarily suspended and a message appears in place of subimages. While this message is being displayed, streaming data is sequentially transmitted from the server on the network to the reproducing apparatus and is accumulated in the buffer memory. As soon as the amount of data accumulated in the buffer memory reaches the previously established threshold value, reproduction of main images is resumed. And the message shown in FIG. 9 disappears and subimages are reproduced in synchronism with main images. This embodiment is designed such that reproduction of main images is temporarily suspended when synchronization becomes unachievable. Therefore, resumption of reproduction after recovery of synchronization does not give the user any uncomfortable feeling. Of course, it is possible to set the reproducing apparatus such that it displays only the message without displaying the main images.

As mentioned above, when the reproducing apparatus is incapable of executing the action which the user wants, it gives a message to the user informing the status, thereby making the user feel easy.

Incidentally, this embodiment is designed such that the information received by the network control unit 202 at the time of streaming is stored in the streamed data memory unit 204. It may be modified such that the received information is entered directly into the buffer memory without being stored. In this case, the demultiplexer is placed at the end of the buffer memory and information is divided according to the kind of packet and then entered into the changeover switch 104.

This embodiment is based on the assumption that the remote control has a button for downloading and a button for streaming. However, modification may be made so that the two buttons are replaced by a single network connection button, which permits the user to access the URL for downloading or the URL for streaming after he has established connection to the network.

Incidentally, this embodiment is designed such that the packet changeover witch has a plurality of buffer memories as shown in FIG. 2. However, modification may be made so that a single memory works in the same way as a plurality of buffer memories.

To be concrete, a plurality of buffer memories may be replaced by RAM which permits reading and writing of various kinds of data.

The reproducing apparatus according to this embodiment is capable of recovering synchronization when streaming is not carried out smoothly owing to network congestion and it becomes impossible to perform reproduction in synchronism with other information.

In addition, when synchronous reproduction is unachievable, it gives the user a message to that effect.

Therefore, the reproducing apparatus and the reproducing method are convenient for the user.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed is:

1. A reproducing apparatus capable of connection to an external display module, which comprises
    a first reproducing unit to reproduce data recorded in a disk-type recording medium,
    a connecting unit for connection to a network,
    a second reproducing unit to reproduce data transmitted from the network through said connecting unit while keeping connection to the network, and
    a control unit for control to display on said display module the data which said first reproducing unit reproduces and the data which said second reproducing unit reproduces, in synchronism with each other, wherein
    said control module displays a message on said display module informing an accidental status in which the data which said first reproducing unit reproduces and the data which said second reproducing unit reproduces cannot be displayed in synchronism with each other and also takes action to recover synchronization for synchronous reproduction.

2. The reproducing apparatus as defined in claim 1, which further comprises
    a memory unit to store the data transmitted from the network through said connecting unit, wherein
    said control unit monitors the amount of data accumulated in said memory unit and performs synchronous reproduction when the amount of accumulated data is more than a threshold value and said control unit monitors the amount of data accumulated in said memory unit and does not perform synchronous reproduction when the amount of accumulated data is less than a threshold value.

3. The reproducing apparatus as defined in claim 2, wherein said control unit performs synchronous reproduction when the amount of accumulated data is more than a threshold value and said control unit does not perform synchronous reproduction when the amount of accumulated data is less than a threshold value, and it also, displays a message to this effect on said display module.

4. The reproducing apparatus as defined in claim 3, wherein said control unit performs synchronous reproduction after waiting until the data transmitted from the network through said connecting unit is accumulated more than a threshold value when the amount of accumulated data is less than a threshold value and synchronous reproduction is not achievable.

5. The reproducing apparatus as defined in claim 3, wherein said control unit displays on the display module the data reproduced by said first reproducing unit and performs synchronous reproduction after waiting until the data transmitted from the network through said connecting unit is accumulated more than a threshold value when the amount of accumulated data is less than a threshold value and synchronous reproduction is not achievable.

6. A reproducing apparatus to reproduce information from a recording medium which comprises
    a reproducing module to read the first stream data from the recording medium,
    a network connecting module for connection to a network,
    a downloaded data memory module to store the second stream data which has been downloaded through the network,
    a reproducing module to reproduce the third stream data transmitted from the network,
    a user interface which is instructed by the user,
    a packet switching module to divide the packets in the entered stream according to the packet identification number and give out the divided packets, said packet switching module having at least three stream input terminals,
    a first buffer memory to temporarily store the stream entered from the first stream input terminal,
    a packet diving module to divide the packets given out from the first buffer memory according to the packet identification number,
    a second buffer memory to temporarily store the stream entered from the second stream input terminal, a third buffer memory to temporarily store the stream entered from the third stream input terminal, a selecting module to select those packets given out from said packet dividing module and those packets given out from said second and third buffer memories, an output terminal to give out those packets selected by said selecting module, a monitoring module to monitor the status of data accumulation in said first to third buffer memories, and a module to recover synchronous reproduction which recovers synchronous reproduction by setting said packet switching module according to the information acquired from said monitoring module when anomaly occurs in synchronous reproduction, in the case of synchronous reproduction by combination of at least two pieces of stream data from the first stream data reproduced from the recording medium, the second stream data reproduced from said downloaded data memory module, and the third stream data transmitted from said network, according to the user's instruction entered through the user interface.

7. A reproducing apparatus to reproduce information from a recording medium which comprises a reproducing module to read the first stream data from the recording medium, a network connecting module for connection to a network, a downloaded data memory module to store the second stream data which has been downloaded through the network, a reproducing module to reproduce the third stream data transmitted from the network, a user interface which is instructed by the user, a packet switching module to divide the packets in the entered stream according to the packet identification number and give out the divided packets, said packet switching module having at least three stream input terminals, a first buffer memory to temporarily store the stream entered from the first stream input terminal, a packet diving module to divide the packets given out from the first buffer memory according to the packet identification number, a second buffer memory to temporarily store the stream entered from the second stream input terminal, a third buffer memory to temporarily store the stream entered from the third stream input terminal, a selecting module to select those packets given out from said packet dividing module and those packets given out from said second and third buffer memories, an output terminal to give out those packets selected by said selecting module, a monitoring module to monitor the status of data accumulation in said first to third buffer memories, and an information display module to inform the user of the working status of the reproducing apparatus, said information display module displays a message informing the user of the content of anomaly when any anomaly occurs in synchronous reproduction according to the information acquired from said monitoring module, in the case of synchronous reproduction by combination of at least two pieces of stream data from the first stream data reproduced from the recording medium, the second stream data reproduced from said downloaded data memory module, and the third stream data transmitted from said network, according to the user's instruction entered through the user interface.

* * * * *

UNITED STATES PATENT AND TRADEMARK OFFICE
CERTIFICATE OF CORRECTION

| | | |
|---|---|---|
| PATENT NO. | : 7,623,759 B2 | Page 1 of 1 |
| APPLICATION NO. | : 11/362733 | |
| DATED | : November 24, 2009 | |
| INVENTOR(S) | : Nozomu Shimoda | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Twenty-sixth Day of October, 2010

David J. Kappos
*Director of the United States Patent and Trademark Office*